(12) United States Patent
Works

(10) Patent No.: US 6,170,850 B1
(45) Date of Patent: Jan. 9, 2001

(54) FIFTH WHEEL TYPE HITCH

(75) Inventor: Joseph W. Works, Humboldt, KS (US)

(73) Assignee: B & W Custom Truck Beds, Inc., Humboldt, KS (US)

( * ) Notice: Under 35 U.S.C. 154(b), the term of this patent shall be extended for 0 days.

(21) Appl. No.: 09/255,617

(22) Filed: Feb. 22, 1999

(51) Int. Cl.$^7$ ................................................ B62D 53/06
(52) U.S. Cl. ...................... 280/433; 280/437; 280/438.1
(58) Field of Search .................................. 280/433, 437, 280/438.1, 439, 441.1, 441.2, 489, 486, 901, 440

(56) References Cited

U.S. PATENT DOCUMENTS

| | | |
|---|---|---|
| 1,334,113 | 3/1920 | Norton . |
| 2,196,537 | 4/1940 | Sherman . |
| 2,306,459 * | 12/1942 | Mennen ................................ 280/439 |
| 2,784,009 | 3/1957 | Braunberger . |
| 3,148,893 | 9/1964 | Cole et al. . |
| 3,237,966 * | 3/1966 | Ayers ................................ 280/438.1 |
| 3,870,342 | 3/1975 | Baxter et al. . |
| 4,567,833 * | 2/1986 | Hanson ........................ 105/199 CB |
| 4,762,334 | 8/1988 | Altherr . |
| 4,892,324 | 1/1990 | Spencer et al. . |
| 4,960,288 * | 10/1990 | Chambers ............................ 280/433 |
| 5,529,329 * | 6/1996 | McCoy ................................ 280/437 |
| 5,639,106 | 6/1997 | Vitale et al. . |
| 5,772,229 * | 6/1998 | Cattau ................................ 280/438.1 |

FOREIGN PATENT DOCUMENTS

| | | | |
|---|---|---|---|
| 111071 * | 8/1940 | (AU) | .................................... 280/433 |
| 0676348 | 1/1991 | (CH) | . |
| 0114046 | 1/1984 | (EP) | . |
| 2106478 | 4/1990 | (JP) | . |

* cited by examiner

*Primary Examiner*—Daniel G. DePumpo
(74) *Attorney, Agent, or Firm*—Shughart Thomson & Kilroy P.C.

(57) ABSTRACT

A fifth wheel type hitch adapted for engaging a king pin of a trailer comprises a hitch head with downwardly opening pivot saddles which are pivotally supported on pivot bearings on a hitch base such that the hitch head pivots fore and aft relative to the hitch base. Outer portions of the pivot bearings are preferably formed from polyurethane. Latches, secured to the hitch head adjacent each pivot saddle, biasingly engage the pivot bearings when the hitch head is supported on the hitch base to prevent the hitch head from being separated therefrom. Lift handles connected to each latch are graspable by a user and pivotal to advance the latches to an unlatching position such that the hitch head can be separated from the hitch base and such that further lifting on the lift handles lifts the hitch head off of the hitch base. The hitch head comprises an intermediate pivot frame, in which the pivot saddles are formed and a coupler assembly which is adapted to releasably engage the king pin. The coupler assembly is pivotally secured to the intermediate pivot frame and pivotal from side to side relative thereto. Side to side pivoting of the coupler assembly is damped by one or more shock absorbers.

14 Claims, 4 Drawing Sheets

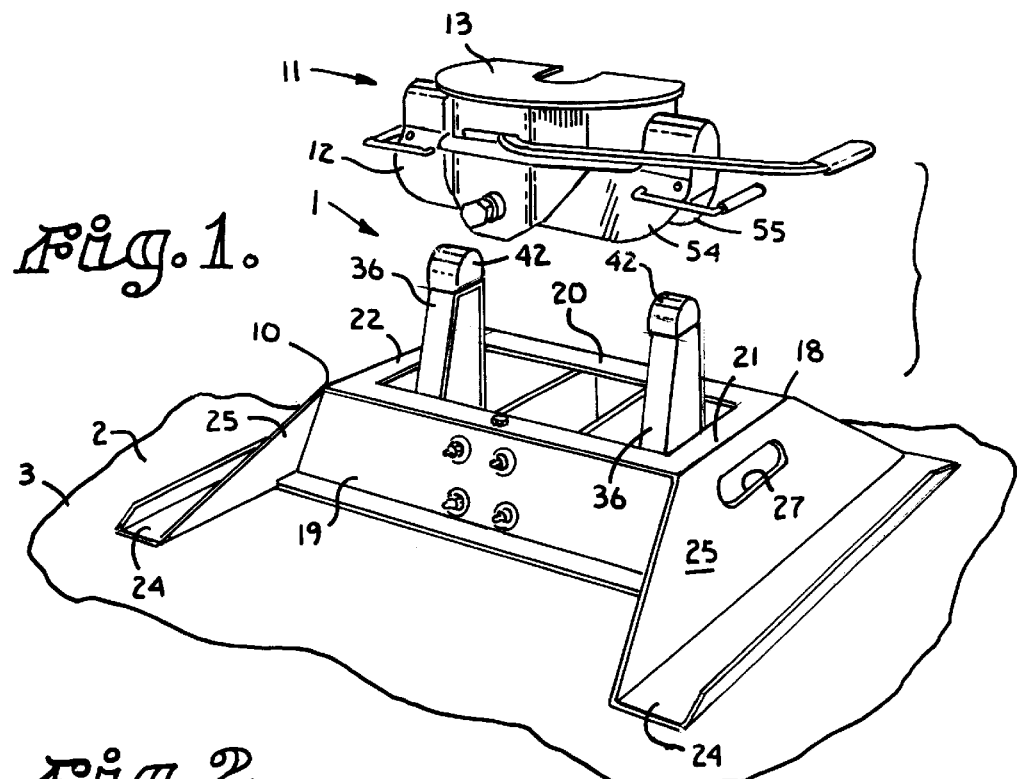
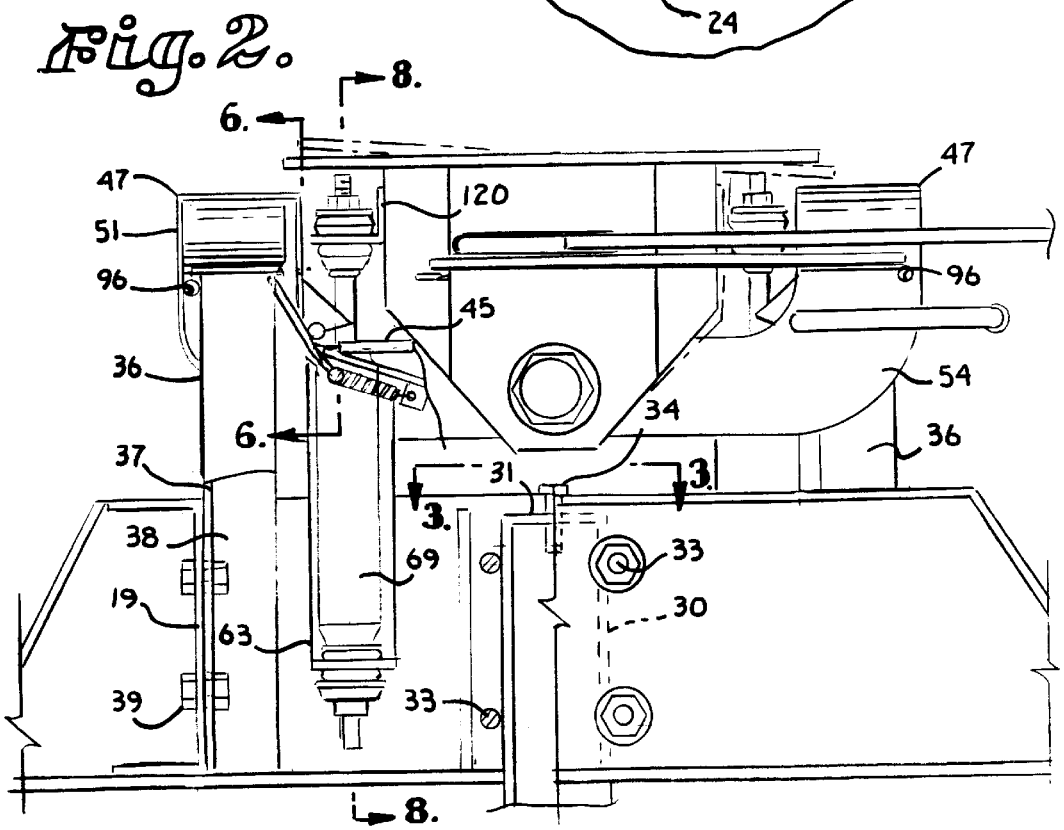

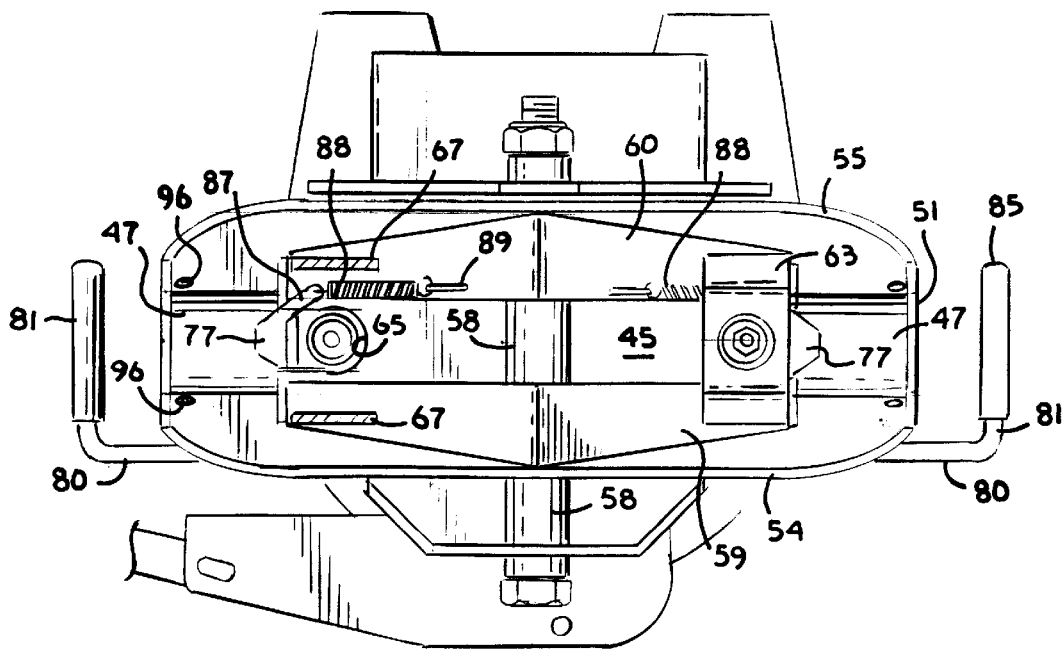
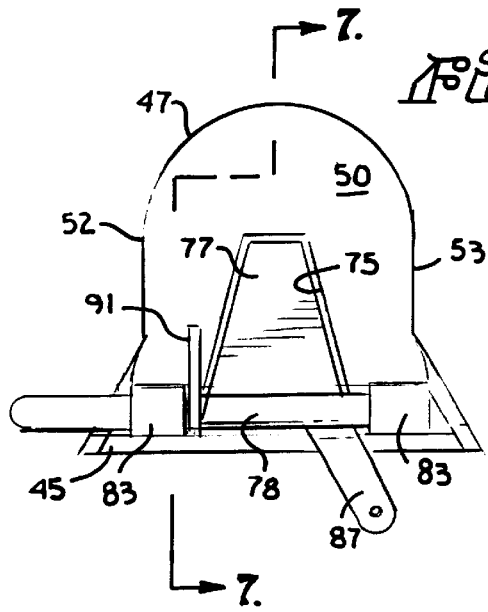
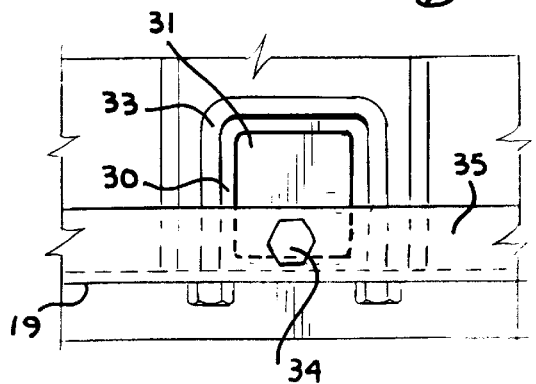

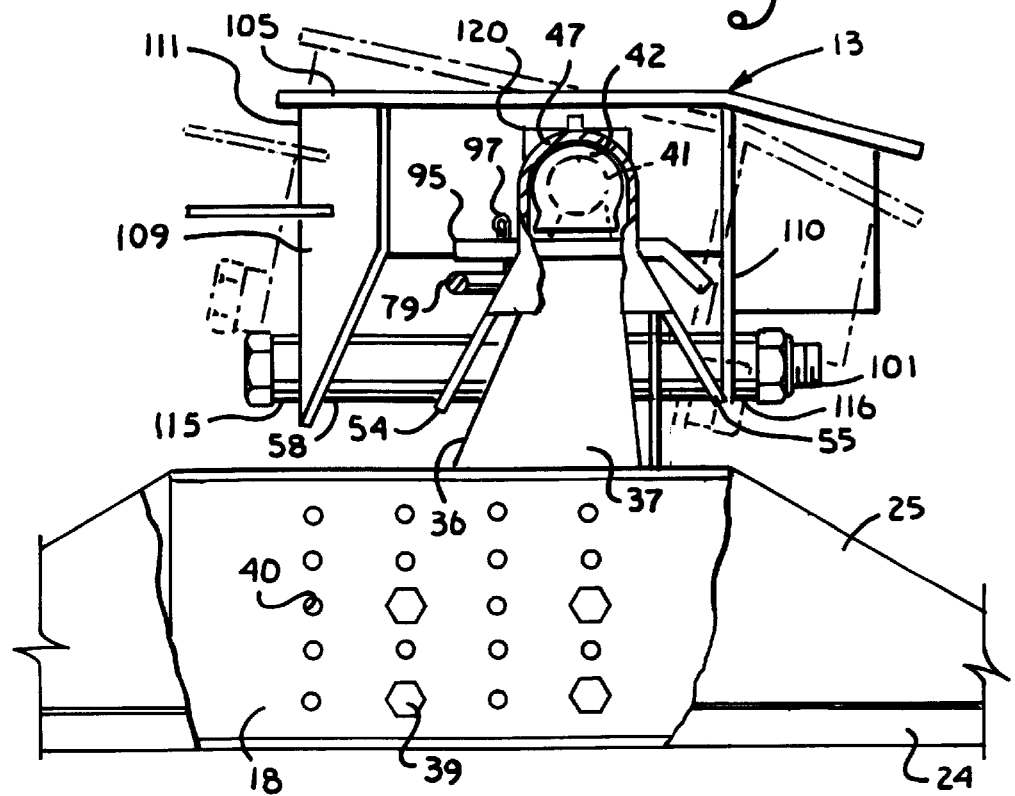
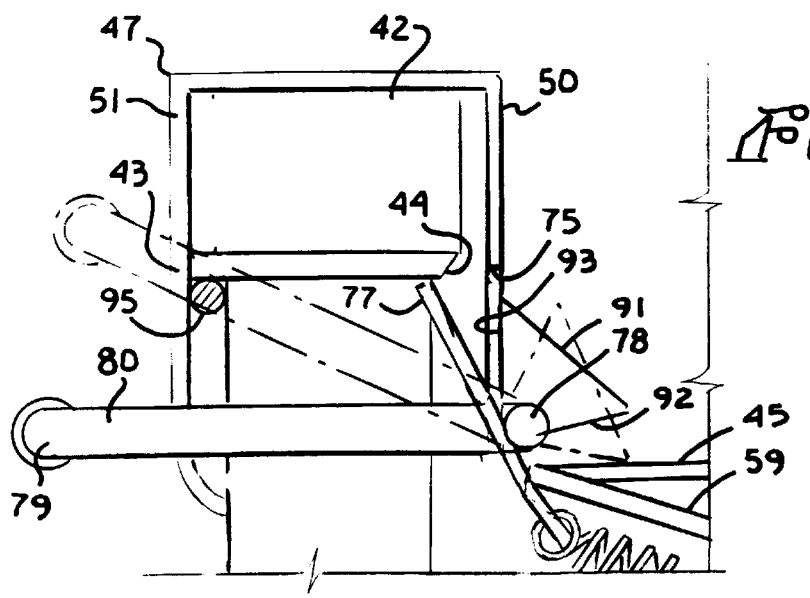

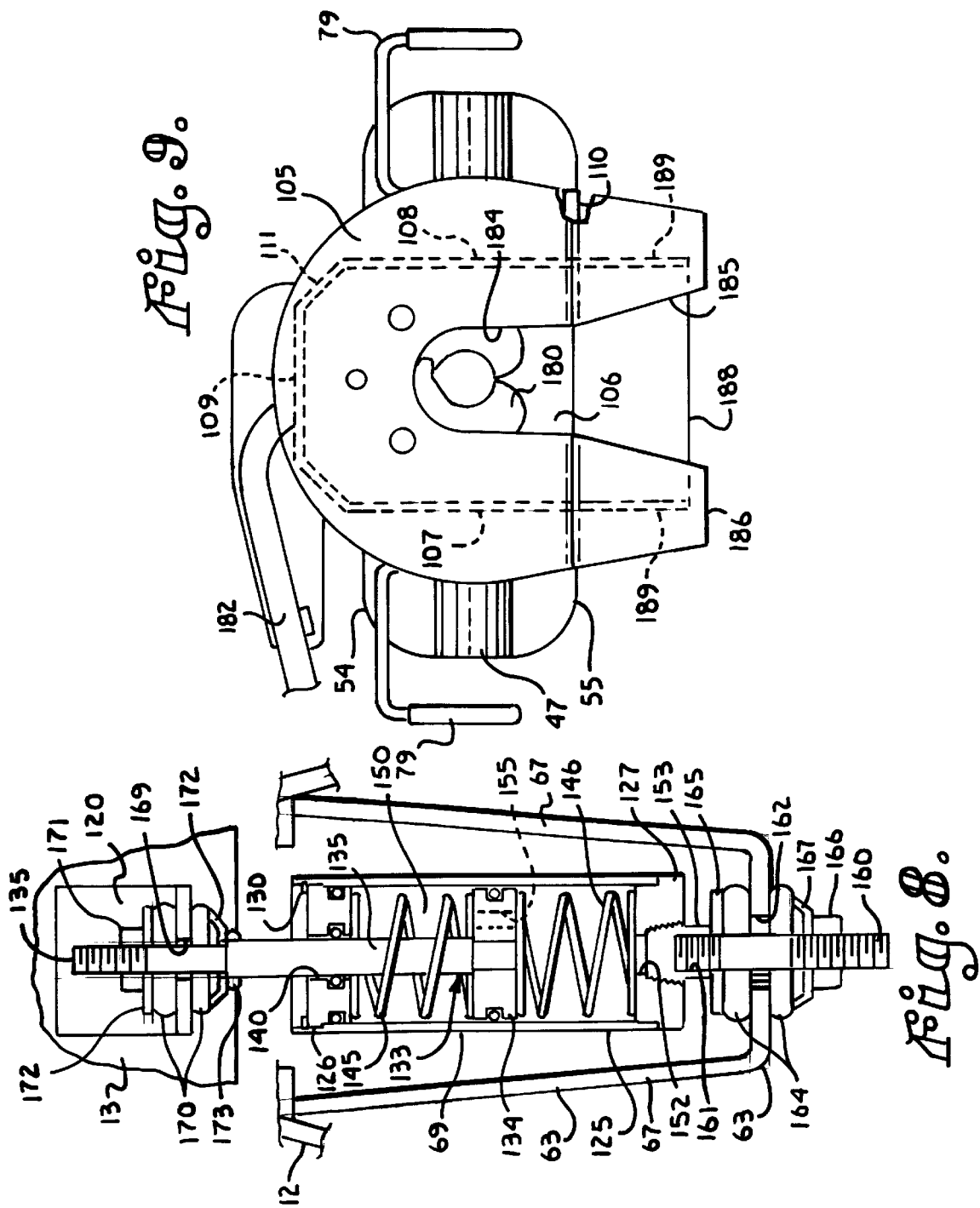

FIFTH WHEEL TYPE HITCH

BACKGROUND OF THE INVENTION

The present invention relates to an improved fifth wheel type hitch.

In many cases, it is desirable to provide a fifth wheel hitch which permits side to side as well as fore and aft pivoting of the coupler head relative to the hitch base. Permitting side to side pivoting of the coupler head relative to the hitch base relieves stresses exerted on the coupling mechanism such as when the trailer is pulled across uneven ground.

It is known to mount the coupler head of a fifth wheel hitch to the hitch base for generally unrestrained side to side pivoting relative thereto. However, in such a system, when the trailer is uncoupled from the coupler head, the coupler head pivots to one side making it difficult to align the coupling mechanism with a king pin when it is necessary to reattach the trailer to the coupler head. Some hitches have a latching mechanism which may be engaged to hold the coupler head in a generally upright rigid state to facilitate coupling with a king pin and then disengaged once the king pin is secured by the coupling mechanism to permit the head to tilt or pivot from side to side as the trailer is towed. However such systems generally do not provide side to side stability to the trailer during towing. In addition, the latching mechanisms of such systems are often difficult to engage and disengage particularly when the trailer and the towing vehicle are positioned on uneven ground.

It is also desirable to have a hitch which can be readily removed from the truck bed in which it is mounted, to permit use of the truck bed when the truck is not used for towing. Existing fifth wheel type hitches tend to be relatively heavy and difficult for a single individual to remove from a truck bed.

There remains a need for an improved fifth wheel hitch which provides both fore and aft and side to side pivoting of the coupler head relative to the hitch base which is relatively stable and which facilitates coupling and uncoupling of the coupling mechanism to a hitch pin and there remains a need for such an improved hitch which is relatively easy to install and remove from a truck bed.

SUMMARY OF THE INVENTION

The present invention comprises a fifth wheel type hitch adapted for engaging a king pin of a trailer. The hitch includes a hitch head including a coupler assembly adapted to engage the hitch pin wherein the hitch head is removably securable to the hitch base and pivotal fore and aft relative thereto. The hitch head includes an intermediate pivot frame with downwardly opening pivot saddles formed therein which are supported on cylindrical pivot bearings mounted on pivot arms extending upward from a base frame of the hitch base. The outer portion of the pivot bearings are preferably formed from polyurethane.

Latches are secured to the intermediate pivot frame adjacent each pivot saddle and are normally biased from a retracted position to a latching position. When latches are biased into the latching position with the hitch head supported on the hitch base, the latches extend underneath and engage the pivot bearings so as to prevent the hitch head from being separated from the hitch base. The latches are pivotally mounted to the intermediate pivot frame. Each latch has a lift handle secured thereto which can be grasped by a user and pivoted to advance the associated latch to the retracted position such that the hitch head may be lifted off of the hitch base by further pulling upward on the lift handles. The lift handles are adapted to support the weight of the hitch head such that the user can move the hitch head using the lift handles.

The coupler assembly is pivotally secured to the intermediate pivot frame and pivotal from side to side relative thereto. At least one shock absorber is secured at a first end to the coupler assembly and at a second end to the intermediate pivot frame to dampen side to side pivoting of the coupler assembly relative to the intermediate pivot frame. The shock absorber or shock absorbers normally bias the coupler assembly to an upright alignment relative to the intermediate pivot frame such that a vertical axis of the coupler assembly extends perpendicular to a horizontal axis of the intermediate pivot frame.

OBJECTS AND ADVANTAGES OF THE INVENTION

The objects of this invention include: providing a fifth wheel hitch with a hitch head for connecting to a king pin which pivots both fore and aft and side to side relative to a hitch base and a truck bed in which it is mounted; to provide such a hitch in which the side to side pivoting of the hitch head is dampened; to provide such a hitch in which the hitch head is self leveling relative to side to side pivoting; to provide such a hitch in which the hitch head is selectively removable from the hitch base to facilitate installation and removal of the hitch from the truck bed; to provide such a hitch in which the hitch head may be securely latched to the hitch base by a releasable latching mechanism; to provide such a hitch in which the latching mechanism includes handles for advancing a latch member into and out of latching engagement with a portion of the hitch base and wherein the handles can also be used for lifting the hitch head off of the hitch base; to provide such a hitch which the hitch base is removably securable to a post extending up through the bed of the truck; to provide such a hitch which minimizes metal to metal contact between bearing surfaces of the hitch head and the hitch base; to provide such a hitch in which pivot bearings, on which the hitch head is supported for fore and aft pivoting, are formed from polyurethane; and to provide such a hitch which is easy to use and install and which is particularly well adapted for its intended uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary and exploded perspective view of a fifth wheel hitch secured in the bed of a pick-up truck with a hitch head separated from a stationary base.

FIG. 2 is an enlarged and fragmentary front elevational view of the fifth wheel hitch with portions removed to show interior detail.

FIG. 3 is an enlarged and fragmentary cross-sectional view taken along lines 3—3 of FIG. 2 showing the stationary base secured to a square tube mounted in the truck bed.

FIG. 4 is a fragmentary left side elevational view with portions removed to show interior detail.

FIG. 5 is an enlarged and fragmentary bottom plan view of the hitch head separated from the stationary base.

FIG. 6 is an enlarged and fragmentary cross-sectional view taken along line 6—6 of FIG. 2 and showing an inner surface of a pivot saddle.

FIG. 7 is a fragmentary cross-sectional view taken generally along line 7—7 of FIG. 6 and showing the motion of a lift handle in phantom lines.

FIG. 8 is an enlarged and fragmentary cross-sectional view taken generally along line 8—8 of FIG. 2 showing the construction of a shock absorber connecting a coupler assembly to an intermediate pivot base.

FIG. 9 is a fragmentary top plan view of the hitch head.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, FIG. 1 is an exploded view of a fifth wheel hitch 1 mounted to the bed 2 of a truck 3 and adapted to couple with a king pin of a trailer. For purposes of this application, directional references will be relative to a person sitting in the cab of the truck 3, such that the front of the hitch 1 is the side facing the front of the truck 3 and the left side of the hitch 1 corresponds to the left side of the person sitting in the truck 3.

The fifth wheel hitch 1 includes a fixed pedestal base or hitch base 10 which is mounted to the truck bed 2 and a hitch head 11 which is pivotally mounted to the base 10 for fore and aft pivoting of the head 11 relative to the base 10. The hitch head 11 includes an intermediate pivot base or frame 12 and a coupler assembly 13.

The hitch base 10 generally comprises an open rectangular frame 18 including front frame member 19, rear frame member 20, left frame member 21 and right frame member 22. Skids 24 are secured to the frame 18 by skid sidewalls 25 which are welded to the frame 18 along the left and right frame members 21 and 22 such that a gap or space is formed between each skid sidewall 25 and the associated left or right frame member 21 or 22. An elongated hole 27 is formed in each skid sidewall 25 to facilitate grasping and moving the hitch base 10.

Referring to FIGS. 2 and 3, the frame 18 is adapted to be secured to a square tube 30 which is removably securable to the pick-up truck 3 so as to extend up through the bed 2 in a manner similar to that of the trailer hitch ball as shown in my previous U.S. Pat. No. 5,016,898. A top plate 31, with a threaded bore extending therethrough is welded to or otherwise secured across the top of square tube 30. Two U-shaped mounting brackets 33 are secured to the front frame member 19 such that ends of the mounting brackets 33 extend forward through the front frame member 19. The U-shaped mounting brackets 33 are adapted to be secured around the square tube 30. A bolt 34 is inserted through a hole extending vertically through an upper lip 35 of front frame member 19 and threaded into the threaded bore of the top plate 31 of square tube 30 to secure the frame 19 to the square tube and to the pick-up truck 3. Nuts on the ends of the U-shaped mounting brackets 33 may be tightened to further secure the hitch base 10 to the square tube 30 and to the truck 3 in the bed 2.

Left and right support arms 36 are secured to and extend upward from the left and right frame members 21 and 22 respectively. The support arms 36 are generally triangular in shape comprising a web 37 and inwardly turned flanges 38 on opposite sides thereof. The support arms 36 are secured to the frame members 21 and 22 by bolts 39 extending through four holes in the web 37 of each arm 36 and four of twenty holes 40 in the left and right frame members 21 and 22 as best seen in FIG. 4. The holes 40 in the left and right frame members 21 and 22 are formed in five rows and four columns to permit the position of the support arms 36 to be adjustable relative thereto. A cylindrical metal pin 41 is welded to the top of each support arm 36 and a semi-cylindrical pivot bushing or bearing 42 formed from polyurethane is molded to the top of each support arm 36 around the cylindrical pin 41. The bearings 42 extend in axial alignment transverse to a longitudinal axis of the hitch 1. The bearings 42 are wider than the support arms 36 so as to form an outer shoulder 43 and an inner shoulder 44 on the bottom of each bearing 42. The inner shoulder 44 of each bearing 42 slopes inward and upward at an angle of approximately forty-five degrees.

The intermediate pivot base 12 is pivotally mounted on the left and right support arms 36 on the hitch base 10 for fore and aft pivoting of the intermediate pivot base 12 on the support arms 36. The intermediate pivot base 12 includes a base plate 45 and a pair of downwardly opening pivot saddles or pivot bearings 47 formed on opposite ends of the base plate 45 and extending thereabove. The pivot saddles 47 are semi-cylindrical and sized and shaped for receiving the bearings 42 of the support arms 36 for supporting the intermediate pivot base 12 on the support arms 36 of the hitch base 10.

Each pivot saddle 47 includes an inner sidewall 50, an outer sidewall 51 a front wall 52 and a rear wall 53. A front skirt 54 and a rear skirt 55 extend between the pivot saddles, generally across and below the base plate 45 of the pivot base 12 along the front and rear thereof. As best seen in FIG. 4, the front and rear skirts 54 and 55 are angled or flared downward and outward relative to the base plate 45.

Referring to FIGS. 4 and 5, a cylindrical bearing sleeve 58 is welded to the bottom of the base plate 45 and extends through the front and rear skirts 54 and 55 in alignment with a longitudinal axis of the intermediate pivot base 12. Front and rear support straps 59 and 60 are welded at their ends to the ends of the base plate 45 and extend along and are welded to the front and rear skirts 54 and 55 respectively so as to extend below the cylindrical bearing sleeve 58. The support straps 59 and 60 are also welded to the cylindrical bearing sleeve 58 and a gap extends between the straps 59 and 60.

U-shaped support brackets 63 are welded to and extend below the support straps 59 and 60 at the ends thereof and in alignment with a transverse axis of the intermediate base 12. A piston opening 65 is formed in the base plate 45 at each end thereof. The piston openings 65 extend between opposed legs 67 of each U-shaped support bracket 63. A hydraulic damper or shock absorber 69 is pivotally secured at a lower end thereof to a bottom of each support bracket 63 between the opposed legs 67. Each hydraulic damper 69 extends through the associated piston opening 65 in the base plate 45 and is connected at a distal end thereof to the coupler assembly 13 as discussed in more detail below.

A notch 75 is formed in the inner sidewall 50 of each pivot saddle 47. The notch 75 opens into the adjacent actuator opening 65. A latch finger 77 is pivotally mounted on a pivot arm 78 of a lift handle 79 associated with each pivot saddle 47 and pivotal in and out of the associated notch 75. Each lift handle 79 is generally U-shaped and includes a cross-arm 80 connecting the pivot arm 78 to a handle arm or grip arm 81. Each pivot arm 78 is pivotally mounted in pivot bearings 83 welded in the corners between the ends of the base plate 45 and the inner sidewalls 50 of the pivot saddles 47. Each pivot arm 78 extends through a hole in the front skirt 54. The cross-arm 80 of each lift handle 79 extends in front of and across the adjacent pivot saddle 47 and the handle arm 81 extends rearward therefrom in parallel and spaced relation to the outer sidewall 51 of the pivot saddle 47 and the pivot arm 78. Grips 85 may be secured to each handle arm 81 to facilitate gripping. Pulling upward on the handle arm 81 of each lift handle 79 causes the pivot arm 78 to rotate within the pivot bearings 83.

The latch finger 77 is welded to the pivot arm 78 generally on the outer side thereof. Each latch finger 77 includes a latch lever 87 extending below the pivot arm 78 and having a first end of a coil spring 88 connected to a lower end thereof. A second end of each coil spring 88 is connected to a tab 89 welded to and extending below the rear support strap 60 and spaced inward from the ends thereof. The coil springs 88 pull the associated latch levers 87 inward, pivotally urging the latch fingers 77 out of the notches 75 in the respective pivot saddles 47 and into a latching position. Pulling upward on the handle arm 81 of each lift handle 79 causes the pivot arm 78 to rotate within the pivot bearings 83 against the biasing force of the spring 88 and pivots the latch finger 77 into an unlatching position in alignment with the notch 75 in the associated pivot saddle 47.

A triangular stop 91, best seen in FIG. 7, is welded to each pivot arm 78. The triangular stops 91 are sized and positioned such that a first edge 92 of each stop 91 engages the base plate 45 when the lift handles 79 are rotated upward a sufficient degree to advance the latch fingers 77 into alignment with the notches 75, thereby preventing further upward rotation of the lift handles 79 and facilitating usage of the lift handles 79 to lift the hitch head 11. A second edge 93 of each stop 91 engages the an inner wall 50 of the adjacent pivot saddle 47 when the lift handles 79 are released and pulled by the respective spring 88 to a horizontal alignment such that the latch finger 77 extends in the latching position.

To attach the hitch head 11 to the hitch base 10, a person lifts the hitch head 11 by the lift handles 79 which pivots the lift handles 79 upward and pivots the latch fingers 77 into the unlatching position. The hitch head 11 is maneuvered to position the pivot saddles 47 over and in alignment with the cylindrical pivot bearings 42 on the support arms 36 and then the hitch head 11 is lowered until the pivot saddles 47 are supported on the cylindrical pivot bearings 42. The lift handles 79 are then released and the springs 88 pull on the latch levers 87, pivoting the latch fingers 77 under the pivot bearings 42 between the flanges 38 of support arms 36. The hitch head 11 can also be lifted by grasping other portions thereof and when dropped onto the cylindrical pivot bearings 42 the latch fingers 77 will be engaged by the pivot bearings 42 and pushed into the associated notches 75 against the biasing force of the springs 88. Engagement of the tips of the latch levers 87 against the underside of the pivot bearings 42 prevents the hitch head 11 from being pulled or lifted off of the support arms without advancing the latch fingers to the unlatching position using the lift handles 79.

Locking pins 95 may be inserted through aligned apertures 96 extending through the front and rear walls 52 and 53 of each pivot saddle 47 so as to extend just below the outer shoulder 43 of the cylindrical pivot bearing 42 on which the pivot saddle 47 is resting, to further prevent the hitch head 11 from being lifted off of or separated from the support arms 36 of the hitch base 10. One end of each locking pin is bent and a cotter pin 97 is secured to the locking pin 95 on a side of the pivot saddle 47 opposite the bent end to prevent its unintended removal from the aligned apertures 96. The locking pins 95 may be secured by chains to the intermediate pivot base 12 to prevent them from being misplaced.

The mating semi-cylindrical shapes of the pivot bearings 42 and the pivot saddles 47 permits the hitch head 11, including the coupler assembly 13, to pivot fore and aft relative to the support arms 36 and the hitch base 10. The polyurethane pivot bearings 42 provide shock and vibration dampening characteristics and provide some self lubrication effects. The surface area contact between the pivot bearings 42 and the pivot saddles 47 is also relatively large. The pivot saddles 47 also act somewhat as an umbrella to the bearing surfaces, protecting the bearing surfaces from the elements.

The coupler assembly 13 is connected to the intermediate pivot base 12 by a pivot pin 101 and the shock absorbers 69. The pivot pin 101 extends from the front to the rear of the coupler assembly 13 medially thereof and the shock absorbers are mounted on opposite sides of the coupler assembly 13 to permit side to side rocking or pivoting of the coupler assembly 13 relative to the intermediate pivot base 12.

Referring to FIG. 9, the coupler assembly 13 includes a top or wheel plate 105, bottom plate 106 with integral left and right sidewalls 107 and 108, front plate 109 and rear plate 110 which are welded together to form a coupler assembly housing or frame 111. The front and rear plates 109 and 110 extend below the bottom plate 106. Front and rear cylindrical bearing sleeves 115 and 116 are welded to the front and rear plates 109 and 110 around pivot pin receiving apertures and below the bottom plate 106. The coupler assembly 13 is connected to the intermediate pivot base 12 by positioning the coupler assembly 13 over the intermediate pivot base 12 such that the front and rear cylindrical bearing sleeves 115 and 116 on the coupler assembly extend in alignment with the cylindrical bearing sleeve 58 on the underside of the intermediate pivot base 12. The pivot pin 101, having a hex head and a threaded end is inserted through the aligned cylindrical bearing sleeves 58 and 115 and 116 and a nut is secured to the end of the pivot pin 101 to secure the pivot pin in the aligned bearing sleeves 58 and 115 and 116.

Mounting flanges 120 are welded to and extend outward from the left and right sidewalls 107 and 108 generally horizontally. Upper ends of the shock absorbers 69 are secured to the mounting flanges 120 such that the coupler assembly 13 is also connected to the intermediate pivot base 12 by the hydraulic dampers 69 which provide resistance to pivoting of the coupler assembly 13 relative to the intermediate pivot base 12 to provide greater stability and a more controlled side to side pivoting action of the coupler assembly 13 and a trailer connected thereto.

Although two hydraulic dampers or shock absorbers 69 are shown, it is foreseen that a single shock absorber 69 could be utilized to provide the desired damping effect. FIG. 8 shows a preferred embodiment of a shock absorber 69 for use with the hitch 1. The relative dimensions of the components shown in FIG. 8 are not to scale but intended to show the general construction.

The shock absorber 69 includes a cylindrical hollow cannister 125 having a top end cap 126 and a bottom end cap 127. The top end cap 126 is secured in place in the top of the cannister 125 between an upper shoulder and a snap ring 130 positioned within a peripheral groove in an inner wall of the cannister 125 just above the top end cap 126. An O-ring is secured to and extends around the outer periphery of top end cap 126 to form a seal between the top end cap 126 and the inner wall of cannister 125. The bottom end cap 127 is positioned in the bottom end of the cannister 125 and secured in place by crimping the cannister 125 around the bottom end cap 127.

The shock absorber 69 includes a piston 133 having a piston head 134 secured at a first end of a piston shaft 135. An O-ring extends around the outer periphery of the piston head 134 and against the inner wall of the cannister 125 to form a seal therebetween. The piston shaft 135 extends through a shaft opening 140 in the top end cap 126. An O-ring is secured to the top end cap 126 around the shaft opening 140 and engages the piston shaft 135 to form a seal therebetween.

A first or upper shock absorber spring 145 is mounted in the cannister 125 between the top end cap 126 and the piston head 134 and a second or lower shock absorber spring 146 is mounted in the cannister 125 between the bottom end cap 127 and the piston head 134. The first and second shock absorber springs 145 and 146 generally exert equal and opposite forces against the piston head 134 to urge the piston head 134 to a central alignment within the cannister 125.

The cannister 125 is adapted to be filled with a somewhat viscous fluid 150 such as hydraulic oil or a 90 weight gear lube oil. The cannister 125 is filled with the fluid 150 through a partially threaded fill hole 152 in bottom end cap 127 which can be closed off with fill hole cap 153. A metering orifice 155 is formed in and extends through the piston head 134 to permit the fluid 150 in the cannister 125 to flow between the portions of the cannister 125 separated by the piston head 134. The resistance provided by the fluid 150 dampens the motion of the piston head 134 and piston shaft 135.

As noted previously, each shock absorber 69 is secured at a lower end to the bottom of one of the U-shaped support brackets 63 on the intermediate pivot base 12 and at an upper end to one of the mounting flanges 120 secured to the coupler assembly 13. The shock absorber 69 is secured to U-shaped support bracket 63 by threaded stud 160 which is secured within threaded bore 161 in the fill hole cap 153. The threaded stud 160 extends through a pivot hole 162 in the bottom of U-shaped support bracket 63. The diameter of pivot hole 162 is greater than the diameter of the threaded stud 160 such that the threaded stud 160 may pivot relative to the pivot hole 162. Flexible rubber washers 164 are positioned on opposite sides of the U-shaped support bracket 63 around the pivot hole 162 and between the fill hole cap 153 and a metal washer 165 on one side and a nut 166 and metal washer 167 on the other side.

The upper end of the piston shaft 135 is threaded and extends through a hole 169 in the associated mounting flange 120. The diameter of the hole 169 is larger than the diameter of the threaded end of the pivot shaft 135 to permit the pivot shaft 135 to pivot relative to hole 169 in mounting flange 120. Flexible rubber washers 170 are positioned on opposite sides of the mounting flange 120 around hole 169 and between a nut 171 and a metal washer 172 on one side and a piston shaft shoulder 173 and a metal washer 174 on the other side.

The connections of the shock absorbers 69 to the mounting flanges 120 and U-shaped support brackets 63 permit the shock absorbers 69 to pivot relative thereto as the coupler assembly 13 pivots relative to the intermediate pivot base 12. In use, if the ground over which a trailer connected to the hitch 1 is pulled tilts the trailer to the left relative to the truck 3, the coupler assembly 13 will pivot to the left relative to the intermediate pivot base 12 pushing the piston 133 of the shock absorber 69 on the left side downward against the biasing force of the second shock absorber spring 146. When the trailer is separated from the hitch 1, the opposingly acting upper and lower shock absorber springs 145 and 146 in the shock absorbers 69 urges the coupler assembly 13 into a relatively upright alignment with respect to the intermediate pivot base 12. In the upright alignment, the vertical axis of the coupler assembly 13 generally extends perpendicular to a horizontal axis of the intermediate pivot base 12. The horizontal axis of the intermediate pivot base is generally considered the horizontal axis extending through the pivot saddles 47 and the axis about which the intermediate pivot base 12 pivots fore and aft relative to the hitch base 10.

The coupler assembly 13 further includes a coupling mechanism comprising a pair of jaws 180 pivotally mounted within the coupler assembly housing 111 and pivotal between an open and a closed alignment. The coupling mechanism may be of the type disclosed in U.S. Pat. No. 3,870,342. A spring (not shown)mounted to the tails of each jaw normally urges the jaws into an open alignment. Advancement of the jaws 180 against a king pin causes the jaws 180 to pivot to a closed alignment around the king pin. A latching mechanism (not shown) connected to latch lever arm 182 may be releasably advanced into a latching relationship with the jaws 180 to hold the jaws 180 in a closed position around the king pin.

A king pin receiving slot 184, with a flared mouth 185 is formed in the top plate 105 and opens rearward. Rear ends 186 of the top plate 105, on opposite sides of the flared mouth 185 slope downward and rearward. The portion of the king pin receiving slot 184 forward of the flared mouth 185 tapers inward slightly and the diameter of the slot 184 proximate a forward end thereof is slightly larger than the diameter of the king pin shaft. A U-shaped support member 188 with upstanding legs 189 is welded to the rear plate 110 such that the upstanding legs 189 support the rear ends 186 of top plate 105.

It is to be understood that while certain forms of the present invention have been illustrated and described herein, it is not to be limited to the specific forms or arrangement of parts described and shown.

What is claimed and desired to be secured by Letters Patent is as follows:

1. A hitch for engaging a hitch pin and comprising:
   a) a hitch base having a pair of upstanding support arms with pivot bearings mounted on upper ends thereof;
   b) a hitch head comprising a coupler assembly connected to an intermediate pivot frame; said coupler assembly adapted to releasably engage the hitch pin; said intermediate pivot frame having a pair of downwardly opening pivot saddles; said pivot saddles removably supportable on said divot bearings such that said intermediate pivot frame is pivotal fore and aft relative to said hitch base; and
   c) a pair of latches each movably mounted to said intermediate pivot frame proximate one of said pivot saddles and biasingly urged from a retracted position to a latching position such that when said latches are positioned in said latching position said latches engage said hitch base and prevent separation of said intermediate pivot frame from said hitch base and when said latches are positioned in said retracted position said latches do not engage said hitch base such that said intermediate pivot frame may be removed from said hitch base.

2. The hitch as in claim 1 wherein:
a) at least an outer portion of said pivot bearings on said support arms are formed from polyurethane.

3. The hitch as in claim 1 wherein:
a) said hitch base comprises a base frame; and
b) each of said support arms is secured to said base frame such that the position of each support arm is adjustable relative to said base frame.

4. The hitch as in claim 1 wherein:
a) said coupler assembly is pivotally secured to said intermediate pivot frame and pivotal from side to side relative to said intermediate pivot frame.

5. The hitch as in claim 4 wherein:
a) at least one shock absorber is secured at a first end to said coupler assembly and at a second end to said intermediate pivot frame to dampen side to side pivoting of said coupler assembly relative to said intermediate pivot frame.

6. The hitch as in claim 5 wherein:
a) said at least one shock absorber normally biases said coupler assembly to an upright alignment relative to said intermediate pivot frame such that a vertical axis of said coupler assembly extends perpendicular to a horizontal axis of said intermediate pivot frame.

7. The hitch as in claim 1 wherein:
a) each of said latches is pivotally mounted to said intermediate pivot frame and has a lift handle connected thereto; said handles manually pivotable to pivot said latches from said latching position to said retracted position.

8. The hitch as in claim 7 wherein:
a) said lift handles are adapted for grasping by a user for supporting said hitch head as said hitch head is advanced onto and removed from said hitch base.

9. The hitch as in claim 5 wherein:
a) said at least one shock absorber normally biases said coupler assembly to an upright alignment relative to said intermediate pivot frame such that a vertical axis of said coupler assembly extends perpendicular to a horizontal axis of said intermediate pivot frame.

10. A hitch for engaging a hitch pin and comprising:
a) a hitch base having a pair of upstanding support arms with pivot bearings mounted on upper ends thereof;
b) a hitch head having a coupler assembly adapted to releasably engage the hitch pin; said hitch head having a pair of downwardly opening pivot saddles; said pivot saddles removably supportable on said pivot bearings such that said hitch head is pivotal fore and aft relative to said hitch base; and
c) a pair of latches each movably mounted to said hitch head proximate one of said pivot saddles and biasingly urged from a retracted position to a latching position such that when said latches are positioned in said latching position said latches engage said hitch base and prevent separation of said hitch head from said hitch base and when said latches are positioned in said retracted position said latches do not engage said hitch base such that said hitch head may be removed from said hitch base.

11. The hitch as in claim 10 wherein:
a) each of said latches is pivotally mounted to said hitch head and has a lift handle connected thereto; said handles manually pivotable to pivot said latches from said latching position to said retracted position.

12. The hitch as in claim 11 wherein:
a) said lift handles are adapted for grasping by a user for supporting said hitch head as said hitch head is advanced onto and removed from said hitch base.

13. The hitch as in claim 10 wherein:
a) at least an outer portion of said pivot bearings on said support arms are formed from polyurethane.

14. The hitch as in claim 10 wherein:
a) said hitch base comprises a base frame; and
b) each of said support arms is secured to said base frame such that the position of each support arm is adjustable relative to said base frame.

* * * * *